United States Patent [19]
Hirose

[11] Patent Number: 6,138,712
[45] Date of Patent: Oct. 31, 2000

[54] CONTROLLER

[75] Inventor: Takashi Hirose, Osaka, Japan

[73] Assignee: Fujikin Incorporated, Osaka, Japan

[21] Appl. No.: 09/321,618

[22] Filed: May 28, 1999

[30] Foreign Application Priority Data

Jun. 2, 1998 [JP] Japan .................................. 10-152606

[51] Int. Cl.[7] ................................................ F16K 37/00
[52] U.S. Cl. ........................ 137/559; 137/556; 251/63.4; 251/335.2; 251/63.5; 251/263
[58] Field of Search ................................. 251/63.4, 63.5, 251/63.6, 335.2, 263; 137/556, 559

[56] References Cited

U.S. PATENT DOCUMENTS

| | | | |
|---|---|---|---|
| 3,297,050 | 1/1967 | Rider ......................................... | 137/556 |
| 3,451,423 | 6/1969 | Priese ........................................ | 137/556 |
| 4,498,495 | 2/1985 | Worwood et al. ........................ | 137/557 |
| 4,877,053 | 10/1989 | Yusko, Jr. et al. ....................... | 137/556 |
| 4,895,341 | 1/1990 | Brown et al. ................................. | 251/8 |
| 5,516,075 | 5/1996 | Itoi et al. .................................. | 251/263 |

*Primary Examiner*—A. Michael Chambers
*Attorney, Agent, or Firm*—Armstrong, Westerman, Hattori, McLeland & Naughton

[57] ABSTRACT

A casing 61 is formed with a guide bore 69 having an open upper end for guiding an operating rod 21. An opening-closing indicator 77 is mounted on an upper end of the operating rod 21 and positioned within the guide bore 69 when a fluid channel is closed with the operating rod 21 in a lowered position. The casing 61 has a transparent convex lens 81 bulging upward from a top surface thereof and closing the open upper end of the guide bore 69. The indicator 77 is positioned as projected upward from the top surface of the casing 61 so as to be visible through the transparent lens 81 when the fluid channel is opened with the operating rod 21 moved to a raised position.

3 Claims, 5 Drawing Sheets

CONTROLLER

BACKGROUND OF THE INVENTION

The present invention relates to controllers for opening and closing fluid channels, and more particularly to a controller having the function of indicating that a fluid channel is open or closed.

Controllers are already well known which comprise a valve body having a fluid channel, a casing disposed above the valve body, an operating rod provided within the casing and movable upward and downward, drive means for moving the operating rod upward and downward, and a valve stem movable upward and downward with the upward and downward movement of the operating rod for opening and closing the fluid channel (see, for example, U.S. Pat. No. 5,556,072).

In the case where the fluid for use with such controllers is a noxious gas, it is desired that the controller have the function of indicating that the fluid channel is open or closed when viewed from outside, whereas controllers having such an opening-closing indicating function still remain to be developed for actual use.

SUMMARY OF THE INVENTION

An object of the present invention is to provide a controller having the function of indicating that a fluid channel is open or closed in reliable operative relation with the opening or closing of the channel, such that the indication can be recognized readily from any direction.

The present invention provides a controller comprising a valve body having a fluid channel, a casing disposed above the valve body, an operating rod provided within the casing and movable upward and downward, drive means for moving the operating rod upward and downward, and a valve stem movable upward and downward with the upward and downward movement of the operating rod for opening and closing the fluid channel, the controller being characterized in that the casing is formed with a guide bore having an open upper end for guiding the operating rod, an opening-closing indicator being mounted on an upper end of the operating rod and positioned within the guide bore when the fluid channel is closed with the operating rod in a lowered position, the casing being provided with a transparent convex lens bulging upward from a top surface thereof and closing the open upper end of the guide bore, the opening-closing indicator being positioned as projected upward from the top surface of the casing so as to be visible through the transparent lens when the fluid channel is opened with the operating rod moved to a raised position.

With the controller of the invention, the valve stem moves upward or downward with the upward or downward movement of the operating rod to open or close the fluid channel, causing the opening-closing indicator provided at the upper end of the operating rod to project from or retract into the casing top surface at the same time and thereby indicating that the fluid channel is open or closed. Preferably, the opening-closing indicator is colored, for example, in a fluorescent color. The indicator is then visible through the transparent lens, readily indicating that the fluid channel is open or closed when the indicator is viewed from any direction.

Preferably, the drive means comprises the combination of a spring and air pressure, or the combination of a spring and a solenoid. Preferably, the controller further comprises a force transmission device for transmitting the force acting on the operating rod to the valve stem on amplification. This results in an advantage in preventing the leakage of the fluid since an increased force is available for closing the fluid channel. The stroke of the operating rod is then greater than that of the valve stem by an amount corresponding to the ratio of amplification of the force, consequently increasing the amount of movement of the opening-closing indicator to render the indicator visible more easily.

DESCRIPTION OF THE REFERRED EMBODIMENT

Figure 1:
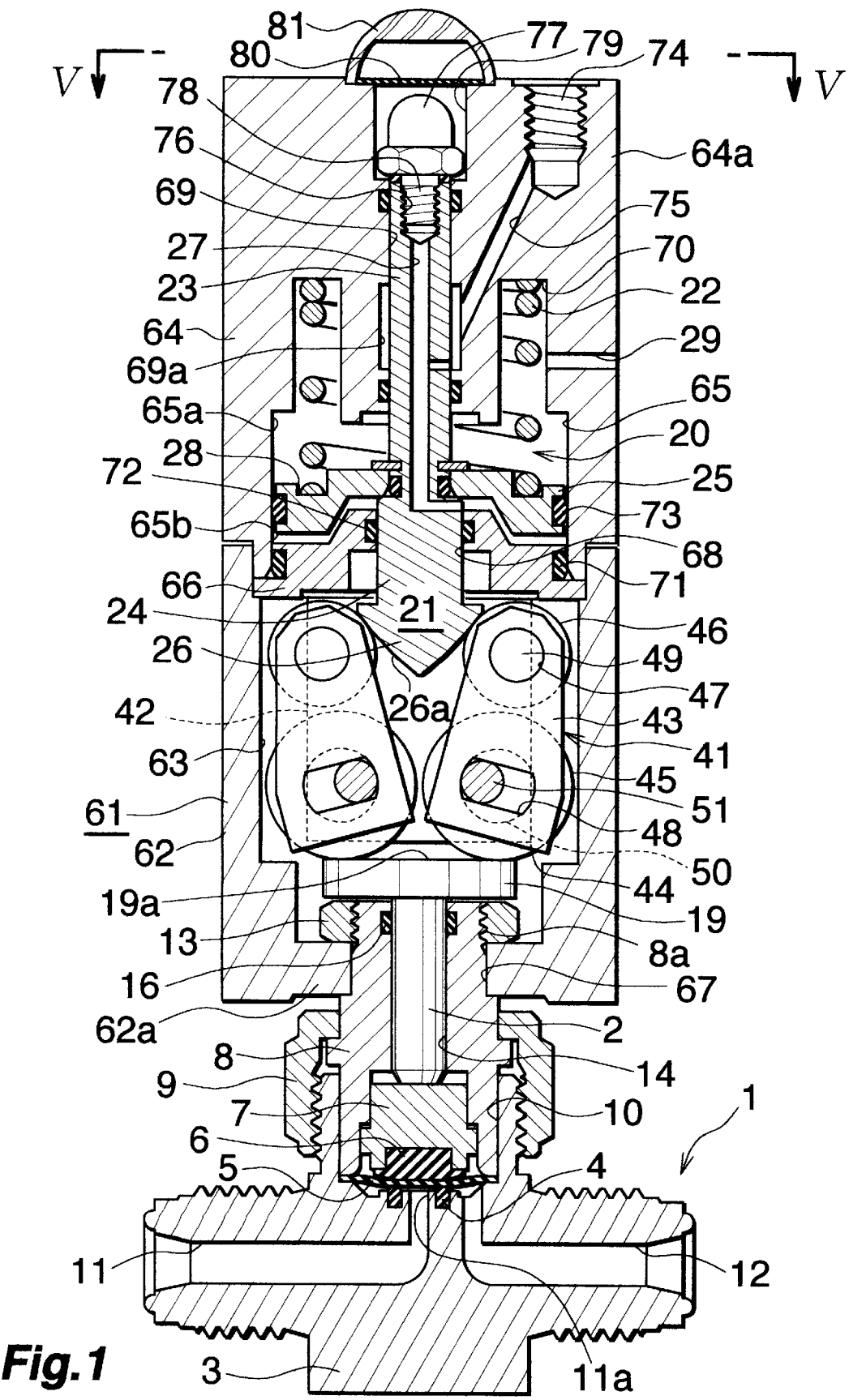
FIG. 1 is a view in vertical section showing a controller of the invention in a channel closing state.
Figure 2:
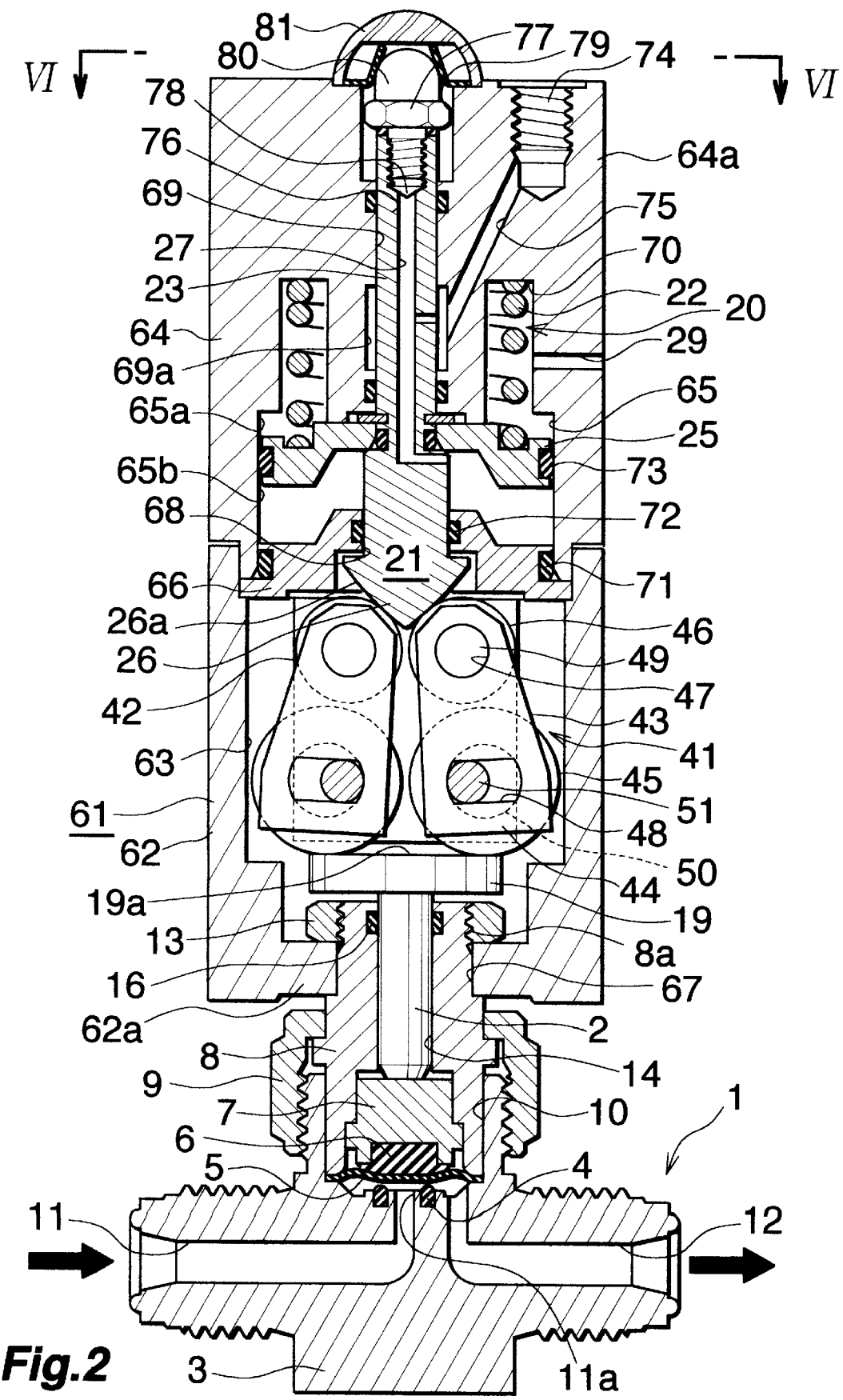
FIG. 2 is a view in vertical section showing the same in a channel opening state.

An embodiment of the invention will be described below with reference to the drawings. In the following description, the term "front" refers to the left-hand side of FIG. 1, the term "rear" to the right-hand side of the drawing, and the terms "right" and "left" are used for the embodiment as viewed from the rear toward the front.

FIGS. 1 to 6 show a controller which comprises a valve body 1, a casing 61 fixed to the upper portion of the valve body 1, an operating rod 21 provided in the upper inside portion of the casing 61 and movable upward and downward, a drive device 20 for moving the operating rod 21 upward and downward, and a force transmission device 41 provided in the lower inside portion of the casing 61 for transmitting a force acting on the operating rod 21 to a valve stem 2.

The valve body 1 comprises a valve case 3 which is formed with a cavity 10 opened upward, a fluid inlet channel 11 having a forwardly open end and another open end in communication with the central portion of bottom of the cavity 10, and a fluid outlet channel 12 having a rearwardly open end and another open end in communication with the rear portion of bottom of the cavity 10. The valve body 1 further comprises an annular valve seat 4 provided on the peripheral edge of the open rear end 11a of the inlet channel 11, a diaphragm (valve element) 5, a diaphragm holder 6, a disk 7 having the diaphragm holder 6 attached to its lower end, the valve stem 2 for moving the disk 7 upward and downward, and a bonnet 8 having a stem guide bore 14 and fastened to the valve case 3 with a nut 9. The fluid channel 11a between the valve element 5 and the valve seat 4 is opened and closed by reciprocating upward and downward movement of the valve stem 2. An O-ring 16 is provided in the stem guide bore 14 around the valve stem 2.

The casing 61 comprises a hollow lower casing member 62 which is open upward, and a hollow upper casing member 64 which is open downward. A partition plate 66 is secured to the inner periphery of the casing portion where the lower end of the upper casing member 64 butts on the upper end of the lower casing member 62. The casing 61 has in its interior a cylinder chamber 65 of circular horizontal section and a force transmission chamber 63 of square or rectangular horizontal section above and below the partition plate 66, respectively. An O-ring 71 is provided between the outer periphery of the partition plate 66 and the inner periphery of lower end of the upper casing member 64. The upper casing member 64 has a top wall 64a which is centrally formed with a guide bore 69 extending vertically for guiding the operating rod 21. An operating rod hole 68 is formed in the partition plate 66 centrally thereof. The lower casing member 62 has a bottom wall 62a which is centrally formed with a bonnet hole 67. The upper end of the bonnet 8 is inserted through the hole 67 and has an externally threaded portion 8a, on which a lock nut 13 is screwed to thereby fix the valve body 1 to the lower casing member 62.

The operating rod 21 comprises a small-diameter portion 23 having its upper end inserted in the guide bore 69 of the upper casing member 64, and a large-diameter portion 24 extending downward from the portion 23, inserted through the rod hole 68 of the partition plate 66 and further extending downward. A piston 25 slidable upward and downward in the cylinder chamber 65 is provided around the lower end of small-diameter portion 23 of the operating rod 21. The cylinder chamber 65 is divided by the piston 25 into an upper cylinder chamber 65a and a lower cylinder chamber 65b. An O-ring 72 is provided inside the rod hole 68 around the large-diameter portion 24 of the operating rod 21. An O-ring 73 is interposed between the outer periphery of the piston 25 and the inner periphery of the upper casing member 64.

Annular spring retaining recesses 28, 70 are formed respectively in the upper surface of piston 25 of the operating rod 21 and in the lower surface of top wall 64a of the upper casing member 64. A spring 22 for biasing the piston 25 downward is fitted in and held by these retaining recesses 28, 70.

An internally threaded vertical portion 74 for connection to a compressed air introduction pipe is formed in the top of top wall 64a of the upper casing member 64. The vertical portion 74 is held in communication with a large bore portion 69a formed at an intermediate part of the guide bore 69 by a compressed air inlet passageway 75.

Extending through the small-diameter portion 23 of the operating rod 21 is a compressed air inlet passageway 27 communicating at an intermediate portion thereof with the large bore portion 69a and at the lower end thereof with the lower cylinder chamber 65b. The peripheral wall of the upper cylinder member 64 is formed with an air outlet port 29 for releasing air from inside the upper cylinder chamber 65a therethrough when the piston 25 moves upward.

An internally threaded vertical portion 76 is formed in the upper end of small-diameter portion 23 of the operating rod 21. Screwed in this portion 23 is a semispherical opening-closing indicator 77 having an externally threaded lower portion 78 and colored in a fluorescent color. The upper-end opening of the air passageway 27 of the small-diameter rod portion 23 is closed with the externally threaded portion 78 of the indicator 77. The rod guide bore 69 has an upper end portion serving as an indicator accommodating portion 79 having a larger diameter than the other portion extending downward therefrom. The upper end of the accommodating portion 79 is closed with a cover 80 of rubber (NBR) having a cross slit 80a (see FIG. 5). This cover 80 is flush with the upper surface of top wall 64a of the upper casing member 64. Provided over the cover 80 is a convex lens 81 made of transparent resin and bulging upward from the upper surface of top wall 64a of the casing member 64. The lens 81 is in the form of a thin semispherical wall having an increased thickness at its top.

The drive device 20 for moving the operating rod 21 upward and downward consists primarily of the piston 25, spring 22, cylinder chamber 65 and air inlet passageway 27. The piston 25 is biased downward by the spring 22 at all times and is driven upward with compressed air introduced into the cylinder chamber 65 via the inlet passageway 27. The force acting on the piston 25 is transmitted to the operating rod 21 to drive the rod 21 upward or downward.

The force transmission device 41 comprises a conical first roller contact member 26 integral with the lower end of large-diameter portion 24 of the operating rod 21 and extending therefrom vertically downward, a second roller contact member 19 integral with the upper end of the valve stem 2, a pair of front and rear roller support members 43 arranged between the two roller contact members 26, 19 symmetrically about the axis of the first roller contact member 26, a pair of front and rear rollable rollers 46 each rotatably supported by the upper portion of the roller support member 43 and in bearing contact with a tapered face 26a of the first roller contact member 25, and a pair of front and rear push rollers 45 each rotatably supported by the lower portion of the roller support member 43 and in bearing contact with an upwardly facing roller support surface 19a of the second roller contact member 19.

The first roller contact member 26 has a bottom diameter larger than the diameter of the large-diameter portion 24 and extends into the transmission chamber 63. The second roller contact member 19 is in the form of a disk and is positioned above the bonnet 8 inside the casing 61.

The front and rear roller support members 43 each comprise a pair of right and left vertical plates 44 for holding the rollable roller 46 and the push roller 45 therebetween. Each of the vertical plates 44 has a circular shaft hole 47 at its upper end portion and a noncircular shaft hole 48 at its lower end portion. Right and left retainers 42 each in the form of a vertical rectangular plate are arranged so as to hold the front and rear support members 43 therebetween, and are secured to the respective right and left side walls of the lower casing member 42 inside thereof.

Each of the front and rear rollable rollers 46 is rotatably fitted around a horizontal shaft 49 extending transversely of the controller and having each of its left and right ends fixedly fitted in the shaft hole 47. Thus, the roller 46 is supported by the corresponding support member 43 rotatably about the horizontal shaft.

Each of the front and rear push rollers 45 is rotatably fitted around a horizontal shaft 50 extending transversely of the controller. Each of the left and right ends of the roller shaft 50 is cut away at its upper and lower sides to provide a fitting portion 53 of noncircular cross section. The shaft hole 48 is shaped in conformity with the cross sectional shape of the fitting portion 53. The fitting portion 53 is fitted in the shaft hole 48, whereby the push roller 45 is supported by the corresponding support member 43 rotatably about the transverse horizontal shaft.

Figure 3:
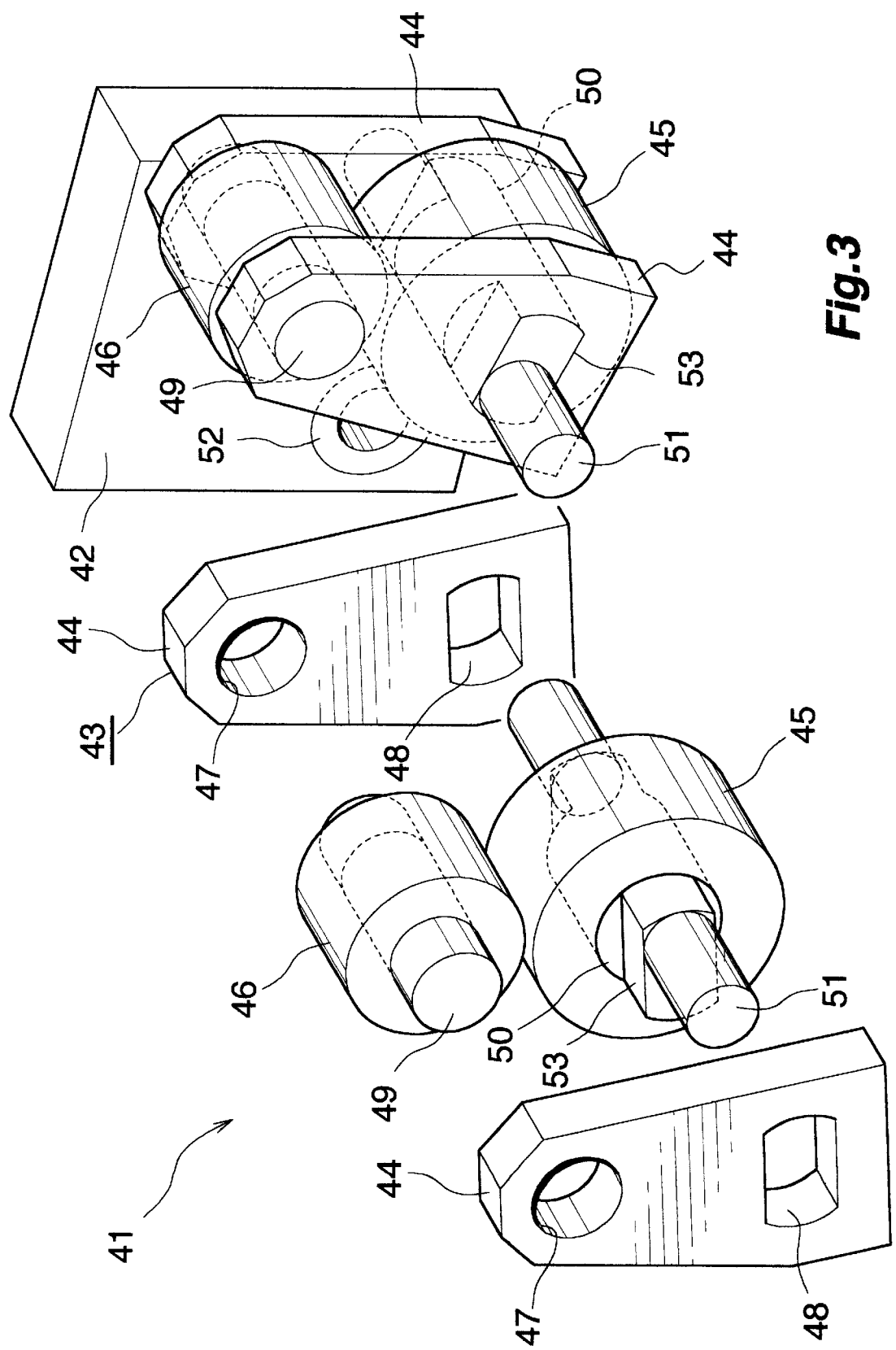
FIG. 3 is an exploded perspective view showing a force transmission device included in the controller of the invention.
Figure 4:
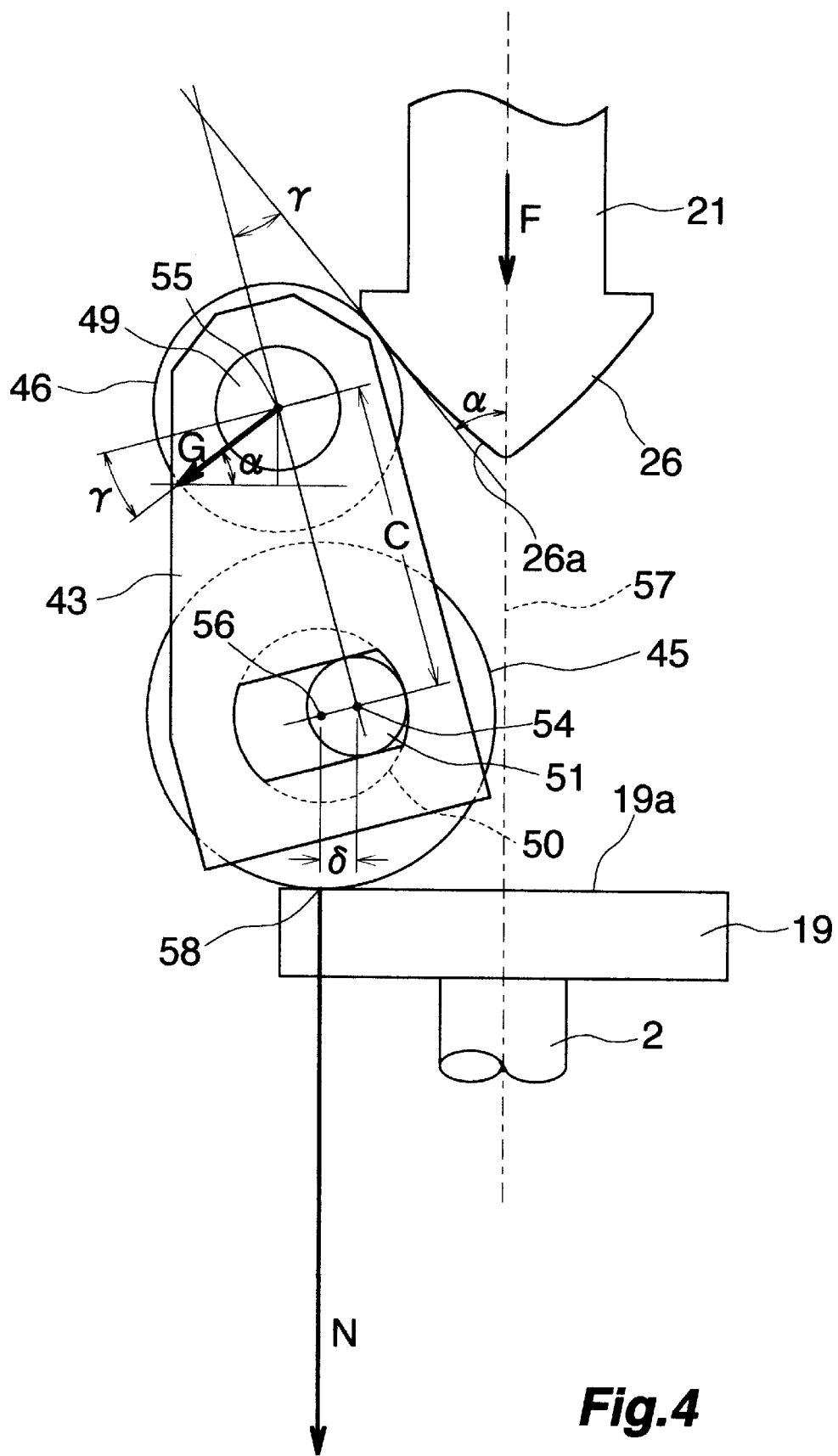
FIG. 4 is a diagram illustrating the principle on which the force acting on an operating rod is transmitted to a valve stem on amplification by the transmission device.
Figure 5:
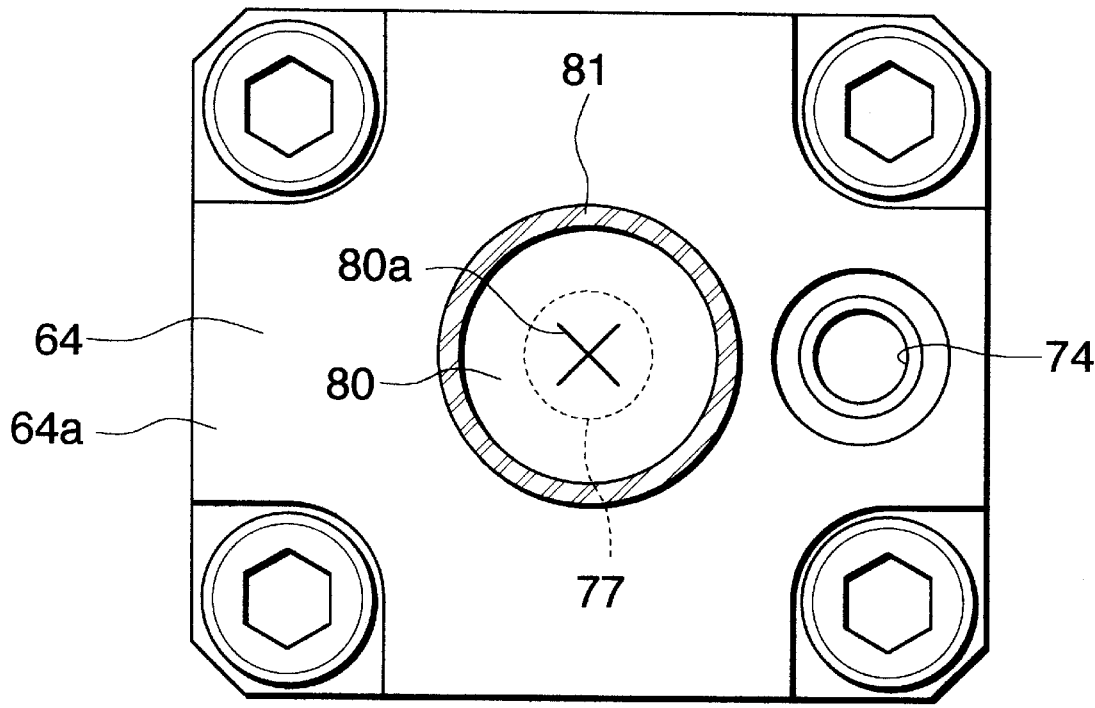
FIG. 5 is a view in section taken along the line V—V in FIG. 1.
Figure 6:
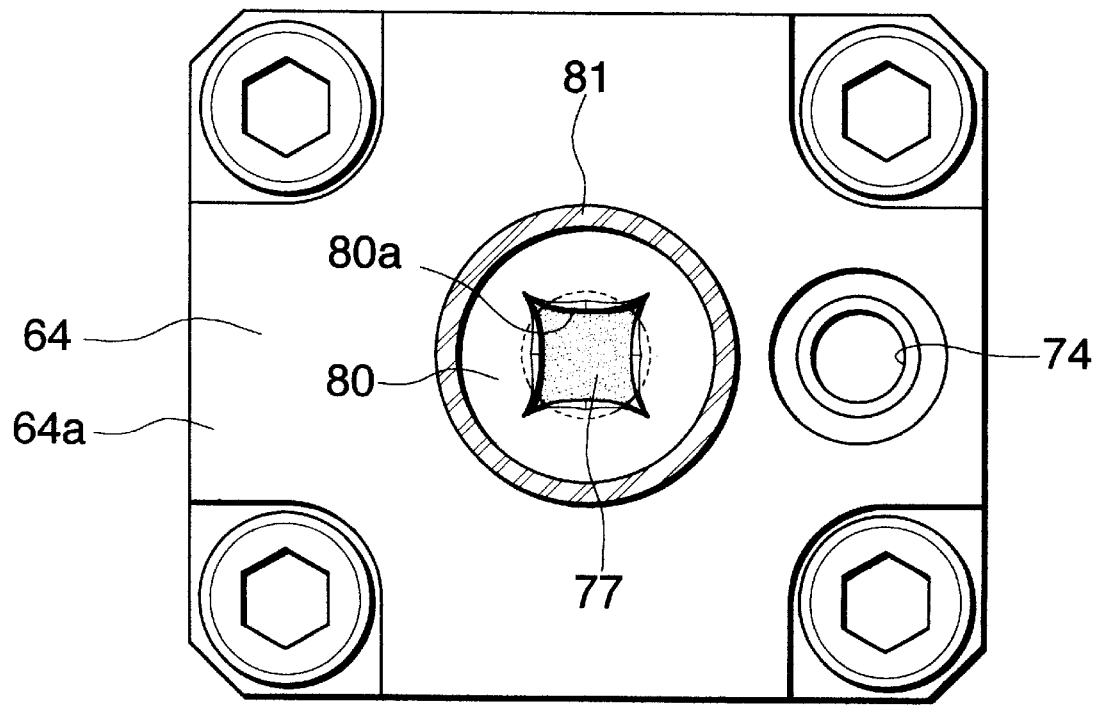
FIG. 6 is a view in section taken along the line VI—VI in FIG. 2.

The shaft 50 of each push roller 45 further has an eccentric pivot 51 which is integral with each of its opposite ends and about which the roller support member 43 is pivotally movable. As shown in FIG. 4, the axis 54 of the eccentric pivot 51, i.e., the central axis of the pivotal movement, is slightly deviated from the axis 56 of the push roller 45 toward the axis 57 of the first roller contact member 26. Further as seen in FIG. 3, the outer end of each eccentric pivot 51 is rotatably fitted in a bearing 52 provided on the corresponding retainer 42, whereby the eccentric pivot 51 is rotatably supported by the lower casing member 62 so as to be immovable forward or rearward, upward or downward, and leftward or rightward, rendering the support member 43 pivotally movable about the axis 54 of the eccentric pivot 51.

When the roller support member 43 is pivotally moved, the axis 56 of the push roller 45 revolves about the axis 54 of the eccentric pivot 51, thereby altering the distance from the axis 56 of the push roller 45 to the point 58 of contact between the push roller 45 and the second roller contact member 19 to vary the pushing force exerted by the push roller 45 on the second roller contact member 19.

When the fluid channel is in the closed state shown in FIG. 1, the operating rod 21 is held in a lowered position by being biased downward by the force of the spring 22, with the front and rear rollable rollers 46 positioned away from each other and with the front and rear push rollers 45 positioned closer to each other. The elastic force of the spring 22 is delivered through the rollable rollers 46, support members 43 and push rollers 45 to the second roller contact member 19, pushing the valve stem 2 downward. This force is transmitted to the diaphragm 5 to hold the open rear end 11a of the fluid inlet channel 11 closed.

The force exerted on the second roller contact member 19 can be made greater than the elastic force of the spring 22 by adjusting the taper angle of the tapered face 26a of the first roller contact member 26, the distance between the axis 54 of the eccentric pivot 51 and the axis 55 of the rollable roller shaft 49 and the horizontal distance between the axis 56 of the push roller shaft 50 and the axis 54 of the eccentric pivot 51 to suitable values. This principle will be described with reference to FIG. 4.

Suppose the elastic force of the spring 22 acting on the operating rod 21 is F, and the half angle of the tapered face 26a of the first roller contact member 26 is $\alpha$. A force then acts on the rollable rollers 46 perpendicular to the tapered face 26a. The force, G, acting on each rollable roller 46 is given by $G = F \div 2 \sin \alpha$.

The force G acting on the rollable roller 46 is transmitted to the second roller contact member 19 via the roller support member 43 and push roller 45.

Suppose the distance between the axis 54 of the eccentric pivot 51 and the axis 55 of the rollable roller shaft 49 is C, the angle a line through the axis 55 of the rollable roller shaft 49 and the axis 54 of the eccentric pivot 51 makes with the tapered face 26a of the first roller contact member 26 is $\gamma$, the horizontal distance from the axis 56 of the push roller shaft 50 to the axis 54 of the eccentric pivot 51 is $\delta$, and the downward pushing force exerted by one of the front and rear push rollers 45 on the second roller contact member 19 is N. The arrangement then has the relationship of $N \times \delta = G \times \cos \gamma \times C$. Accordingly, the downward force with which the front and rear two push rollers 45 push the second roller contact member 19, i.e., the downward pushing force on the valve stem 2, is given by $2N = F \times \cos \gamma \times C \div \sin \alpha \div \delta$. Thus, the force acting on the operating rod 21 can be transmitted as amplified at a desired ratio to the stem 2 by determining suitable values for $\alpha$, $\gamma$ and $\delta$.

With the present embodiment, $\alpha = 40°$, $\gamma = 25°$, $C = 12.5$, $\delta = 1.5$, and the amplification ratio is about 12 times.

When compressed air is sent into the compressed air inlet passageway 75, the air is supplied to the cylinder chamber 65 from the lower portion thereof via the air inlet passageway 27 of the small-diameter portion 23 of the operating rod 21. Consequently, an upward force acts pneumatically on the piston 25. When made greater than the downward force of the spring 22, this force drives the operating rod 21 upward. This movement moves the front and rear rollable rollers 46 toward each other, pivotally moves the front and rear roller support members 43 and moves the front and rear push rollers 45 away from each other. Accordingly, the distance from the axis of each push roller 45 to the point 58 of contact of the push roller 45 with the second roller contact member 19 decreases to eliminate the downward pushing force exerted by the push roller 45 on the valve stem 2, whereupon the diaphragm 5 is pushed up by fluid pressure to open the fluid channel 11a (see FIG. 2). At the same time, the opening-closing indicator 77 provided at the upper end of the operating rod 21 moves upward with the rod 21, pushing up the rubber cover 80 having the slit 80a and becoming exposed on the top of the casing 61. The opening of the fluid channel can then be readily recognized from any direction by viewing the indicator through the transparent lens 81 (see FIGS. 2 and 6).

The controller operates satisfactorily when the air pressure required to open the fluid channel 11a is slightly greater than the elastic force of the spring 22. Since the elastic force of the spring 22 can be made small based on the principle of amplification illustrated in FIG. 4, the air pressure necessary for opening the fluid channel 11a can be small. The amount of stroke of the operating rod 21 is equal to the amount of stroke of the valve stem 2 multiplied by the ratio of amplification of the force, so that the amount of movement of the indicator 77 is increased to render the indicator 77 readily visible.

Although the operating rod 21 is driven by air pressure when opening the fluid channel 11a according to the foregoing embodiment, the rod 21 can be driven alternatively, for example, by a solenoid instead of air pressure. It is also possible to hold the fluid channel closed by a valve stem which is urged downward with air pressure, force of a solenoid or the like which is greater than the force of a spring biasing an operating rod upward and to open the fluid channel by removing the air pressure, force of the solenoid or the like.

What is claimed is:

1. A controller comprising a valve body 1 having a fluid channel 11a, a casing 61 disposed above the valve body 1, an operating rod 21 provided within the casing 61 and movable upward and downward, drive means 20 for moving the operating rod 21 upward and downward, and a valve stem 2 movable upward and downward with the upward and downward movement of the operating rod 21 for opening and closing the fluid channel 11a, the controller being characterized in that the casing 61 is formed with a guide bore 69 having an open upper end for guiding the operating rod 21, an opening-closing indicator 77 being mounted on an upper end of the operating rod 21 and positioned within the guide bore 69 when the fluid channel is closed with the operating rod 21 in a lowered position, the casing 61 being provided with a transparent convex lens 81 bulging upward from a top surface thereof and closing the open upper end of the guide bore 69, the opening-closing indicator 77 being positioned as projected upward from the top surface of the casing 61 so as to be visible through the transparent lens 81 when the fluid channel is opened with the operating rod 21 moved to a raised position.

2. A controller according to claim 1 wherein the opening-closing indicator 77 is colored in a fluorescent color.

3. A controller according to claim 1 which further comprises a force transmission device 41 for transmitting a force acting on the operating rod 21 to the valve stem 2 on amplification.

* * * * *